(12) United States Patent
Schlierbach (10) Patent No.: US 8,599,482 B2
(45) Date of Patent: Dec. 3, 2013

(54) TELESCOPIC SIGHT

(76) Inventor: Armin Schlierbach, Leun (DE)

( * ) Notice: Subject to any disclaimer, the term of this patent is extended or adjusted under 35 U.S.C. 154(b) by 392 days.

(21) Appl. No.: 12/872,676

(22) Filed: Aug. 31, 2010

(65) Prior Publication Data

US 2011/0047854 A1 Mar. 3, 2011

(30) Foreign Application Priority Data

Sep. 3, 2009 (DE) .......................... 10 2009 039 851

(51) Int. Cl.
*G02B 23/00* (2006.01)

(52) U.S. Cl.
USPC ............................ 359/428; 359/429; 359/431

(58) Field of Classification Search
USPC ............... 359/428, 429, 431; 356/8, 9, 18, 19
See application file for complete search history.

(56) References Cited

U.S. PATENT DOCUMENTS

| | | | |
|---|---|---|---|
| 4,806,007 A * | 2/1989 | Bindon | 359/424 |
| 4,969,723 A * | 11/1990 | Kato et al. | 359/429 |
| 5,126,549 A | 6/1992 | Yamada | |
| 5,262,838 A * | 11/1993 | Tocher | 356/16 |
| 5,771,623 A | 6/1998 | Pernstich et al. | |
| 6,204,961 B1 * | 3/2001 | Anderson et al. | 359/353 |
| 6,292,314 B1 | 9/2001 | Perger | |
| 7,271,954 B2 * | 9/2007 | Perger et al. | 359/407 |
| 7,706,065 B2 * | 4/2010 | Regan et al. | 359/431 |
| 2005/0219690 A1 | 10/2005 | Lin et al. | |
| 2006/0010762 A1 | 1/2006 | Lin et al. | |
| 2012/0106170 A1 * | 5/2012 | Matthews et al. | 362/311.06 |

FOREIGN PATENT DOCUMENTS

| | | |
|---|---|---|
| DE | 4438955 A1 | 5/1996 |
| DE | 19933172 C1 | 1/2001 |
| DE | 19949800 A1 | 4/2001 |
| EP | 0709705 A2 | 5/1996 |
| EP | 2 078 975 B1 | 7/2009 |
| WO | 0077554 A1 | 12/2000 |
| WO | 2006084689 A2 | 8/2006 |
| WO | 2008099939 A1 | 8/2008 |
| WO | 2009/094687 A2 | 8/2009 |

OTHER PUBLICATIONS

"Workbook" for the subject G36 Assault Rifle; Brauckhoff, Germany (Jan. 2006) pp. 1-21, XP007915923.

* cited by examiner

*Primary Examiner* — Frank Font
(74) *Attorney, Agent, or Firm* — GrayRobinson, PA (57) ABSTRACT

The invention relates to a telescopic sight with an objective to face a target object to be observed in a working position, an eyepiece to face an observer, a visual observation beam path, an inner tube with an inversion system, means for adjusting the direction of the sight line of the telescopic sight, a rangefinder and with a scope housing, in which are integrated the rangefinder, which has a transmitter for emitting a measurement beam and a receiver for receiving the reflected measurement beam, and arranged in the region of the observation beam path a beam splitter element, which couples the emitted measurement beam into the part of the observation beam path extending toward the objective and/or decouples the received reflected measurement beam from the part of the observation beam path extending toward the objective. The transmitter of the rangefinder, the receiver of the rangefinder and the beam splitter element are fixed in an immovable fashion with respect to each other and to the inner tube of the telescopic sight such that they are also movable by the means of the telescopic sight for adjusting the direction of the sight line.

51 Claims, 6 Drawing Sheets

TELESCOPIC SIGHT

CROSS REFERENCE TO RELATED APPLICATIONS

This application claims priority under 35 U.S.C. §119(a)-(d), to German Application No. 10 2009 039 851.1 filed Sep. 3, 2009, the entire disclosure of which is hereby expressly incorporated by reference in its entirety to form part of this application.

FIELD OF THE INVENTION

The invention relates to a telescopic sight with an objective to face a target object to be observed in a working position, an eyepiece to face an observer, a visual observation beam path, an inner tube with an inversion system, means for adjusting the direction of the sight line of the telescopic sight, a rangefinder and with a scope housing.

By way of example, EP 0 709 705 B1 has disclosed such a telescopic sight. There, a telescopic sight for firearms is specified, with a reticle, a device for adjusting the reticle on the point of impact and a laser rangefinder for the target with a laser transmitter and a laser receiver, wherein the telescopic sight objective is simultaneously the objective for the laser transmitter and the laser receiver since the beam path of the laser transmitter and the beam path of the laser receiver are brought into the visual telescopic sight beam path, and the device for adjusting the reticle on the point of impact has an optical member movable relative to the reticle between the reticle and the light entrance side of the telescopic sight.

A telescopic sight as per WO 2006/084689 A2 has an optical axis and a sight line. First means are used for adjusting the direction of the sight line. A rangefinder that is provided with a light source for emitting a measuring transmission beam is structurally connected to the telescopic sight. The measuring transmission beam extends outside the telescopic sight. The direction thereof basically corresponds to the direction of the sight line. Second means are used for automatically correcting the direction of the measuring transmission beam when the direction of the sight line is adjusted. The light source is pivotally disposed on the telescopic sight. The second means are embodied as a gear which is effective between the telescopic sight and the light source. Thus, the external rangefinder must be corrected to the elevation or the sight line by means of appropriate additional means.

Moreover, DE 44 38 955 C2, WO 00/77554 A1, US 2005/0219690 A1, DE 199 33 172 C1 and WO 2008/099939 A1 are referred to in respect of the prior art.

SUMMARY OF THE INVENTION

The present invention is based on the object of designing a telescopic sight of the type mentioned at the outset in a very compact fashion and with high adjustment stability between rangefinder beam path and visual observation beam path.

According to the invention, this object is achieved by a telescopic sight with an objective to face a target object to be observed in a working position, an eyepiece to face an observer, an observation beam path, an inner tube with an inversion system, means for adjusting the direction of the sight line of the telescopic sight, a rangefinder and with a scope housing, in which are integrated the rangefinder, which has a transmitter for emitting a measurement beam and a receiver for receiving the reflected measurement beam, and arranged in the region of the observation beam path a beam splitter element, which couples the emitted measurement beam into the part of the observation beam path extending toward the objective and/or decouples the received reflected measurement beam from the part of the observation beam path extending toward the objective, wherein the transmitter of the rangefinder, the receiver of the rangefinder and the beam splitter element are fixed in an immovable fashion with respect to each other and to the inner tube of the telescopic sight such that they are also movable by the means of the telescopic sight for adjusting the direction of the sight line.

The measures according to the invention advantageously bring about coupling and decoupling of the transmitter beam path and the receiver beam path of the rangefinder by one and the same prism system or beam splitter element. This firstly enables a compact design of the telescopic sight because the rangefinder beam path is integrated into the optical observation beam path and secondly enables high adjustment stability because a separate mechanical correction is no longer necessary for the transmitter of the rangefinder in particular. As a result of the internal design, the rangefinder can, so to speak, move with the beam splitter element and the elevation. This results in a mechanically stable and rigid coupling in a combined component. If the inner tube of the telescopic sight is now adjusted by means of the elevation setting, i.e. using the means of the telescopic sight for adjusting the direction of the sight line, then this component is moved about a fulcrum of the inner tube together with the inversion system or inversion-zoom system and the reticle. As a result, the radiation, more particularly the laser light of the rangefinder, is always guided in the same direction as the sighting light. The beam path of the transmitter and the receiver is, so to speak, coupled precisely on the axis of the inversion-zoom system. As a result of this, the laser beam is aligned precisely on the sight line. A compact telescopic sight is developed, which does not require an additional external attachment for the rangefinder.

According to the invention, provision can furthermore be made for the beam splitter element to have a monolithic design without image inversion and to have at least a first objective-side wedge-shaped subprism and at least a second eyepiece-side wedge-shaped subprism, which respectively have interfaces, between which at least a first interface plane is provided.

The acute angles of the first wedge-shaped subprism and of the second wedge-shaped subprism can lie in a range between 17.5° and 35°, more particularly in a range between 22.5° and 30°, preferably at approximately 25°.

The bases of the first wedge-shaped subprism and of the second wedge-shaped subprism can each have a right angle, which is situated opposite the respective interfaces of the first wedge-shaped subprism and of the second wedge-shaped subprism.

In a constructive configuration of the invention, provision can be made for the interfaces of the first wedge-shaped subprism and of the second wedge-shaped subprism to abut in the first interface plane.

It is advantageous for the measurement beam emanating from the transmitter to impinge on a first surface of the first wedge-shaped subprism, traverse the first wedge-shaped subprism under one or more reflections on the inner faces thereof, be deflected into the part of the observation beam path extending toward the objective at the first interface plane and be guided to a target object. This advantageously affords the possibility of combining together the laser transmitter beam path and the observation beam path. For this, an additional optical element, more particularly a prism, can be arranged on the beam splitter element or on the first wedge-shaped subprism, by means of which optical element the measurement beam emanating from the transmitter is guided onto the first surface of the first wedge-shaped subprism. The first interface plane can in a region adjoining the additional optical element have a reflectance greater than or equal to 50%, preferably approximately 70%, and a transmittance less than or equal to 50%, preferably approximately 30%, for the wavelength range of the measurement beam. The optical properties could also be selected in a complementary fashion to obtain the same effect. Thus, it would also be feasible for the region of the first interface plane adjoining the additional optical element to have a transmittance greater than or equal to 50%, preferably approximately 70%, and a reflectance less than or equal to 50%, preferably approximately 30%, for the wavelength range of the measurement beam.

In a further refinement according to the invention, provision can be made for the beam splitter element to have an additional third subprism with an objective-side interface and an eyepiece-side interface between the first wedge-shaped subprism and the second wedge-shaped subprism. Arranging a further subprism in the beam splitter element allows the optimization of the aspect ratios.

The interface of the first wedge-shaped subprism and the objective-side interface of the third subprism can abut in a second interface plane. The interface between the second wedge-shaped subprism and the eyepiece-side interface of the third subprism can abut in the first interface plane.

It is advantageous for a measurement beam emanating from the transmitter to impinge on a surface of the third subprism, traverse the third subprism at least in part, be deflected into the part of the observation beam path extending toward the objective on the first interface plane and be guided to the target object. Accordingly, the laser transmission beam path can also be combined with the visual observation beam path when a third subprism is used.

It is advantageous for a received reflected measurement beam incident on the first wedge-shaped subprism along the observation beam path to be deflected out of the observation beam path at the first interface plane or at the second interface plane, traverse the first wedge-shaped subprism under a plurality of reflections on the inner faces thereof, emerge from a surface of the first wedge-shaped subprism and be guided onto the receiver. This advantageously also allows the receiver beam path of the rangefinder to be combined with the visual observation beam path, as a result of which the telescopic sight according to the invention can have a very compact design.

The telescopic sight can additionally have a display device, more particularly a display or reticle, for displaying an image in the observation beam path.

According to the invention, provision can furthermore be made for the image from the display device to be able to be coupled into the part of the observation beam path extending toward the eyepiece by means of the beam splitter element.

An optical element or an optical component can be provided between the beam splitter element and the display device in order to allow imaging from the display device in the eyepiece-side or objective-side intermediate plane of the telescopic sight.

It is advantageous for the display device to be likewise fixed in an immovable fashion to the transmitter of the rangefinder, the receiver of the rangefinder, the beam splitter element and to the inner tube of the telescopic sight such that the display device are also movable by the means of the telescopic sight for adjusting the direction of the sight line.

In addition to laser rangefinders, it is known to equip telescopic sights with further additional functions such as inclinometers, ballistics calculators, thermometers, barometers, illumination or the like. These additional functions or measurement results are displayed such that they are visible in the eyepiece. For this, it is known to provide a display directly in an image plane of the visual observation beam path of the telescopic sight, which is disadvantageous in that not all of the visual field remains available to the observer. However, the telescopic sight according to the invention advantageously allows additional data, such as distance, temperature or the like or for example a reticle, to be reflected in via the beam splitter element and be superposed on the visual image of the observation beam path.

It is advantageous for a display light emanating from the display device to impinge on a surface of the second wedge-shaped subprism, traverse the second wedge-shaped subprism, in particular under a plurality of reflections on the inner faces thereof, and be deflected into the part of the observation beam path extending toward the eyepiece at the first interface plane. This also allows coupling in of a display beam path or the like.

The first interface plane in at least one portion can have a transmittance greater than or equal to 95% for the visual observation light and a reflectance greater than or equal to 99% for the wavelength range of the measurement beam. Hence, the transmittance is only approximately 65% in the wavelength range of the display light. The first interface plane in at least one portion can have a reflectance greater than or equal to 30% for the wavelength of the display light, wherein the transmittance can be only approximately 65% in the wavelength range of the display light. Moreover, the second interface plane in at least one portion can have a transmittance greater than or equal to 95% for the visual observation light and a reflectance greater than or equal to 50% for the wavelength range of the measurement beam.

The rangefinder can be designed as a laser rangefinder and the transmitter can be designed as a laser diode, more particularly with a wavelength range between 850 and 950 nm, preferably 905 nm, or with a wavelength range between 1500 and 1600 nm, preferably 1540 nm. Selecting a wavelength range between 1500 and 1600 nm can increase the eye safety. Moreover, such a wavelength is difficult to detect, in particular by night vision equipment or the like, or cannot be detected at all.

Advantageously, a mirror element, more particularly a silver mirror, can be provided on the first wedge-shaped subprism in the region of the transmitter, as a result of which the received measurement beam is very strongly reflected, e.g. over 95%, to the inner face of the first wedge-shaped subprism in this region, despite a possibly present relatively steep angle of incidence.

The first wedge-shaped subprism and the second wedge-shaped subprism of the beam splitter element can be arranged twisted with respect to one another such that the beam splitter element is designed as a plane-parallel plate in at least one portion in the traversal direction of the observation beam path, even if the third subprism is present.

A further splitter element can be arranged for splitting emitted and received reflected measurement beams in the beam direction between firstly the beam splitter element and secondly the transmitter of the rangefinder and the receiver of the rangefinder.

The further splitter element can be likewise fixed in an immovable fashion to the transmitter of the rangefinder, the receiver of the rangefinder, the beam splitter element and to the inner tube of the telescopic sight such that the further splitter element are also movable by the means of the telescopic sight for adjusting the direction of the sight line.

The further splitter element can have a reflectance greater than or equal to 50%, preferably approximately 70%, and a transmittance less than or equal to 50%, preferably approximately 30%, for the wavelength range of the measurement beam. The optical properties could also be selected in a complementary fashion to obtain the same effect. Thus, it would also be feasible for the further splitter element to have a transmittance greater than or equal to 50%, preferably approximately 70%, and a reflectance less than or equal to 50%, preferably approximately 30%, for the wavelength range of the measurement beam.

The beam splitter element of the telescopic sight according to the invention can also be used to couple and decouple a rangefinder beam path or a reticle or other data in a binocular telescope, a spotting scope or a periscope.

BRIEF DESCRIPTION OF THE DRAWINGS

Advantageous refinements of the invention emerge from the dependent claims. Exemplary embodiments of the invention are described hereinbelow in principle with the aid of the drawings.
In the Figs.

DETAILED DESCRIPTION OF PREFERRED EMBODIMENTS

Figure 1:
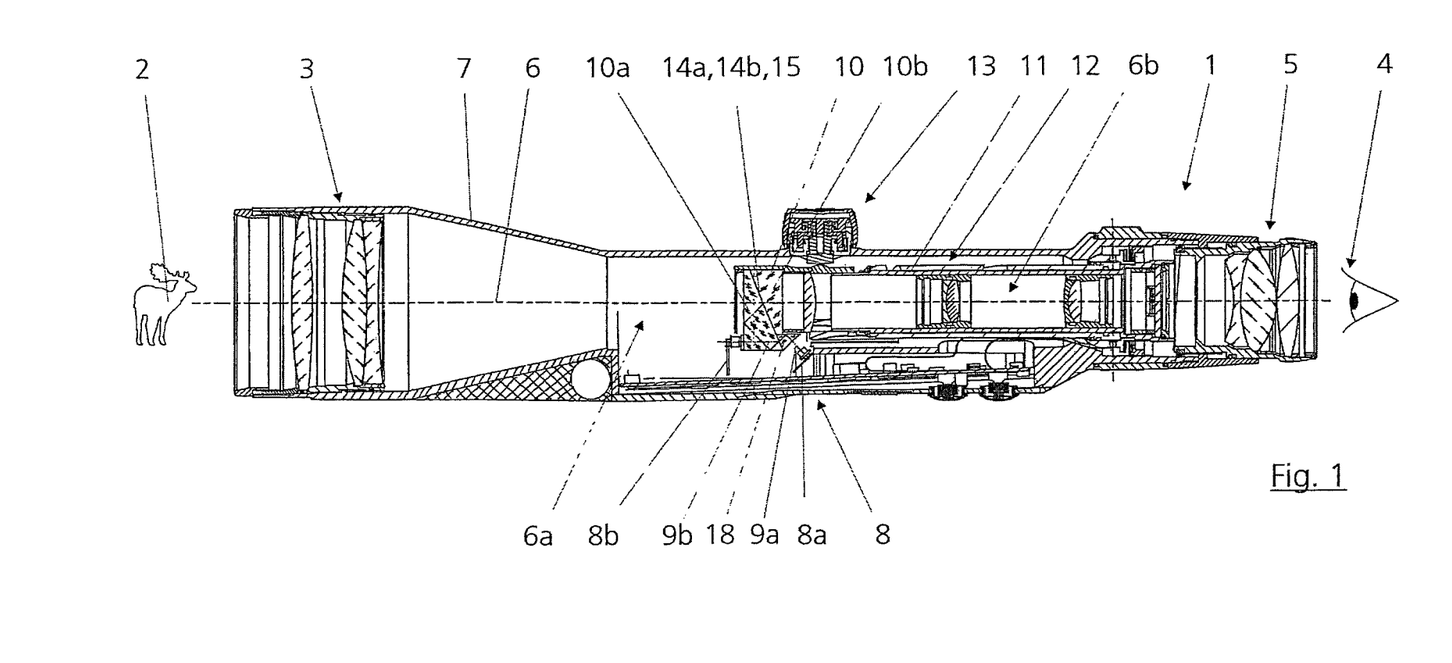
FIG. 1 shows a simplified sectional view of a telescopic sight according to the invention.

FIG. 1 illustrates a telescopic sight 1 according to the invention. The telescopic sight 1 is provided with an objective 3 to face a target object 2 to be observed in a working position and an eyepiece 5 to face an observer 4. The telescopic sight 1 has a sight line or a visual observation beam path 6, which coincides with the optical axis of the telescopic sight 1 in a normal setting of the telescopic sight 1. The telescopic sight 1 has a scope housing 7, in which are integrated a rangefinder 8, which has a transmitter 8a for emitting a measurement beam 9a and a receiver 8b for receiving the reflected measurement beam 9b, more particularly reflected from the target object 2, and, in a first embodiment, arranged in the region of the observation beam path 6 a beam splitter element 10, which couples the emitted measurement beam 9a into the part 6a of the observation beam path 6 extending toward the objective 3 and/or decouples the received reflected measurement beam 9b from the part 6a of the observation beam path 6 extending toward the objective 3. In the telescopic sight 1 there is, on the side facing away from the objective 3, an inner tube 11 mounted such that it can pivot relative to the optical axis, more particularly about a fulcrum, in or on which inner tube are arranged an inversion-zoom system or inversion system 12 and the beam splitter element 10. Moreover, provision is made for means 13 for adjusting the inner tube 11 and hence the sight line in the telescopic sight 1. The means 13 have two towers offset by 90° on the circumference of the telescopic sight 1, only one of which is shown in FIG. 1. The means 13 for adjusting the direction of the sight line are of the type as described in WO 2006/084689 A2, mentioned at the outset, and so the disclosure of said document may be referred to here for simplicity.

The transmitter 8a of the rangefinder 8, the receiver 8b of the rangefinder 8 and the beam splitter element 10 are fixed in an immovable fashion with respect to each other and to the inner tube 11 of the telescopic sight 1 such that they are also movable by the means 13 of the telescopic sight 1 for adjusting the direction of the sight line. This is likewise the case in the arrangements of the transmitters 8a, the receivers 8b and the beam splitter elements 10', 10'', 10''', 100 as per FIGS. 2 to 4 and 10. FIGS. 2 to 4 and 10 illustrate further embodiments of beam splitter elements 10, which, with the necessary adjustments, can likewise be provided in the telescopic sight 1 according to the invention.

The beam splitter element 10 has a monolithic design without image inversion and has a first objective-side wedge-shaped subprism 10a and a second eyepiece-side wedge-shaped subprism 10b, which respectively have interfaces 14a, 14b between which a first interface plane 15 is provided. The beam splitter element 10 in the first embodiment is illustrated in more detail in FIGS. 5 to 9.

The acute angles of the first wedge-shaped subprism 10a and of the second wedge-shaped subprism 10b can lie in a range between 17.5° and 35°, more particularly in a range between 22.5° and 30°. In the present exemplary embodiment, the acute angles $\alpha_1$, $\beta_1$ each are 25° (see FIG. 5).

Figure 2:
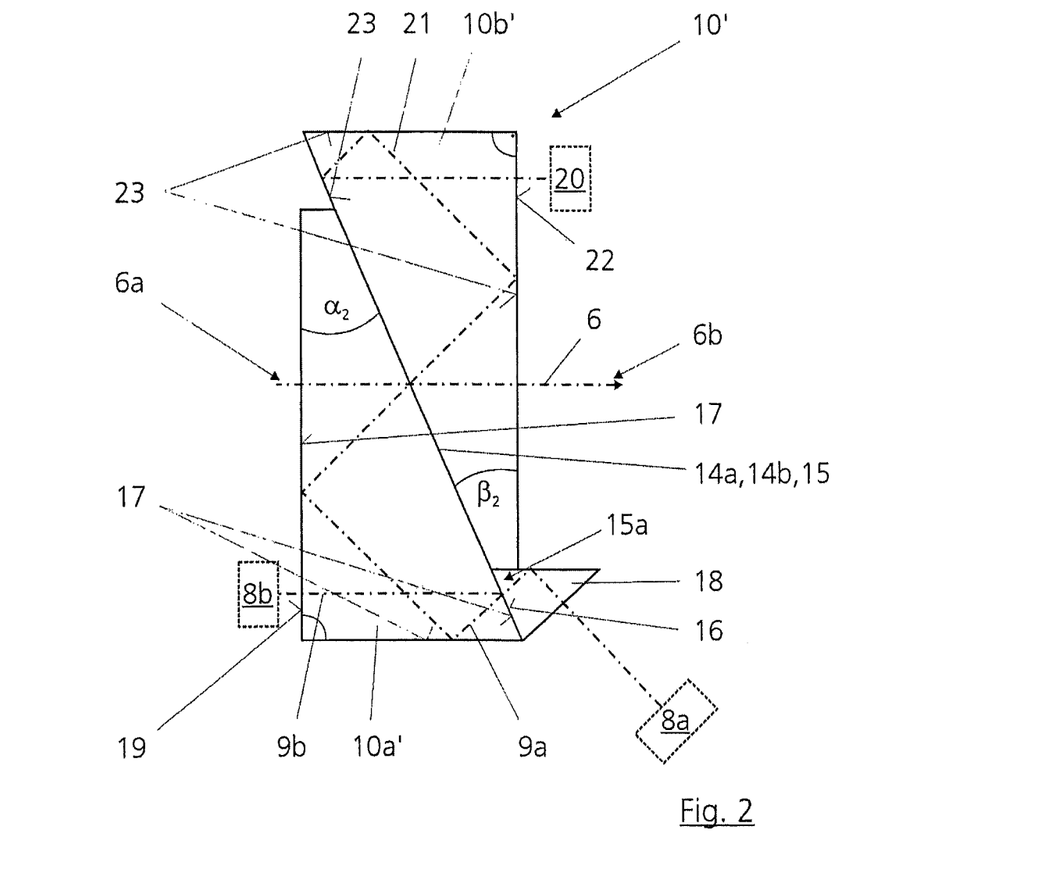
FIG. 2 shows a schematic side view of a beam splitter element in a second embodiment for the telescopic sight according to the invention.

FIG. 2 schematically illustrates a second embodiment of a beam splitter element 10. The interfaces 14a, 14b of the first wedge-shaped subprism 10a' and the second wedge-shaped subprism 10b' abut in the first interface plane 15.

The bases of the first wedge-shaped subprism 10a' and of the second wedge-shaped subprism 10b' each have a right angle, which is situated opposite the respective interfaces 14a, 14b of the first wedge-shaped subprism 10a' and of the second wedge-shaped subprism 10b'.

The measurement beam 9a emanating from the transmitter 8a impinges on a first surface 16 of the first wedge-shaped subprism 10a', traverses the first wedge-shaped subprism 10a' under a plurality reflections on the inner faces 17 thereof, is deflected into the part 6a of the observation beam path 6 extending toward the objective 3 at the first interface plane 15 and is guided to the target object 2. A prism 18, as an additional optical element, is arranged on the beam splitter element 10' or on the first wedge-shaped subprism 10a', by means of which prism the measurement beam 9a emanating from the transmitter 8a is guided onto the first surface 16 of the first wedge-shaped subprism 10a'.

A received reflected measurement beam 9b incident on the first wedge-shaped subprism 10a' along the observation beam path 6 is deflected out of the observation beam path 6 at the first interface plane 15, traverses the first wedge-shaped subprism 10a' under a plurality of reflections on the inner faces 17 thereof, emerges from a second surface 19 of the first wedge-shaped subprism 10a' and is guided onto the receiver 8b.

It furthermore emerges from FIG. 2 that an image of a display device 20 can additionally be coupled into the part 6b of the observation beam path 6 extending toward the eyepiece 5 by means of the beam splitter element 10'. The display light 21 emanating from the display device 20 impinges on a surface 22 of the second wedge-shaped subprism 10b', traverses the second wedge-shaped subprism 10b' under a plurality of reflections on the inner faces 23 thereof, and is deflected into the part 6b of the observation beam path 6 extending toward the eyepiece 5 at the first interface plane 15.

The display device 20 is likewise fixed in an immovable fashion to the transmitter 8a of the rangefinder 8, the receiver 8b of the rangefinder 8, the beam splitter element 10' and to the inner tube 11 of the telescopic sight 1 such that the display device 20 are also movable by the means 13 of the telescopic sight 1 for adjusting the direction of the sight line.

The first interface plane 15 has a transmittance greater than 95% for the visual observation light and a reflectance greater than 99% for the wavelength range of the measurement beam 9a, 9b in the direction of propagation of the visual observation light. Moreover, the first interface plane 15 has a reflectance greater than 30% for the wavelength of the display light 21 in the direction counter to the propagation of the visual observation light, with the transmittance only being approximately 65% in the wavelength range of the display light 21, for example ±20 nm around the display wavelength. The first interface plane 15 has in a region 15a adjoining the prism 18 a reflectance of 70% and a transmittance of 30% for the wavelength range of the measurement beam 9a, 9b. The optical properties could also be selected in a complementary fashion to obtain the same effect. Thus, it would also be feasible for the region of the first interface plane 15 adjoining the prism 18 to have a transmittance greater than or equal to 50%, preferably approximately 70%, and a reflectance less than or equal to 50%, preferably approximately 30%, for the wavelength range of the measurement beam 9a, 9b.

In the beam splitter element 10' in FIG. 2, the acute angle $\alpha_2$ of the first wedge-shaped subprism 10a' and the acute angle $\beta_2$ of the second wedge-shaped subprism each are 22.5°.

Figure 3:
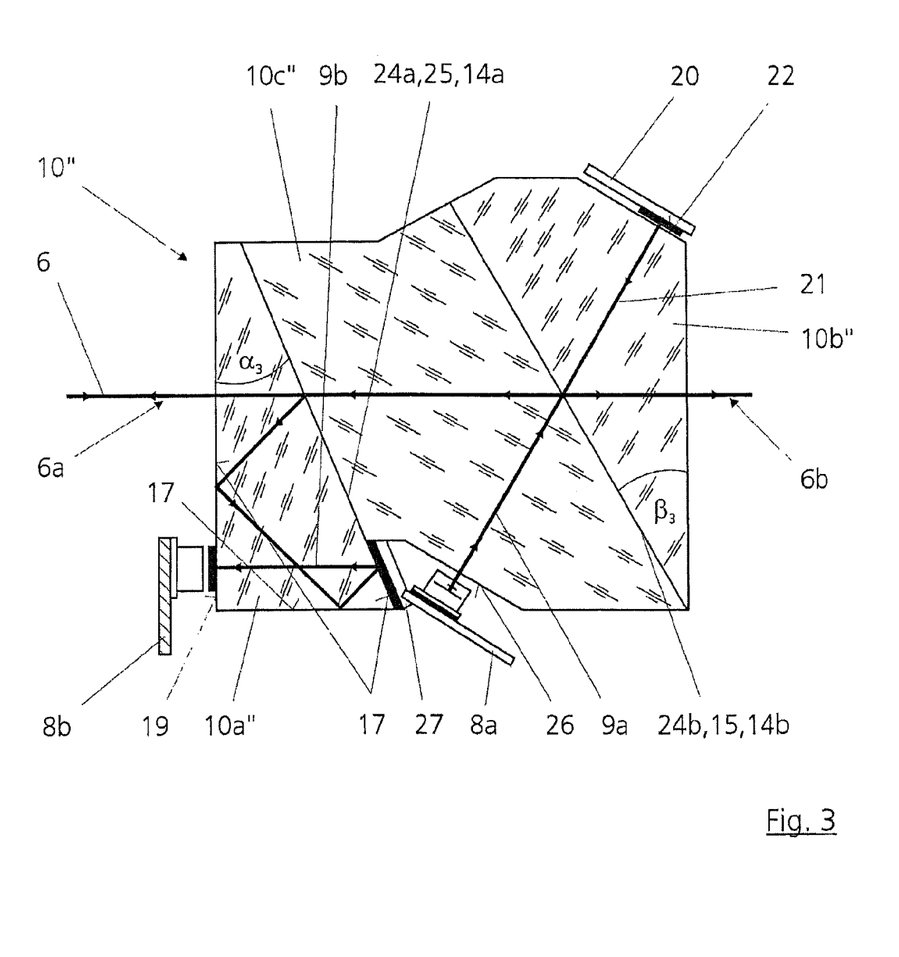
FIG. 3 shows a schematic side view of a beam splitter element in a third embodiment for the telescopic sight according to the invention.

FIG. 3 shows a third embodiment of a beam splitter element 10". The beam splitter element 10" has an additional third subprism 10c" with an objective-side interface 24a and an eyepiece-side interface 24b between a first wedge-shaped subprism 10a" and a second wedge-shaped subprism 10b". The interface 14a of the first wedge-shaped subprism 10a" and the objective-side interface 24a of the third subprism 10c" abut in a second interface plane 25 and the interface 14b of the second wedge-shaped subprism 10b" and the eyepiece-side interface 24b of the third subprism 10c" abut in the first interface plane 15. The measurement beam 9a emanating from the transmitter 8a impinges on a surface 26 of the third subprism 10c", traverses the third subprism 10c", is deflected into the part 6a of the observation beam path 6 extending toward the objective 3 at the first interface plane 15 and is guided to the target object 2. The received reflected measurement beam 9b incident on the first wedge-shaped subprism 10a" along the observation beam path 6 is deflected out of the observation beam path 6 at the second interface plane 25, traverses the first wedge-shaped subprism 10a" under a plurality of reflections on the inner faces 17 thereof, emerges from the surface 19 of the first wedge-shaped subprism 10a" and is guided onto the receiver 8b. The first interface plane 15 has a transmittance greater than 95% for the visual observation light and a reflectance greater than 99% for the wavelength range of the measurement beam 9a, 9b. The first interface plane 15 has a reflectance greater than 30% and a transmittance less than 65% for the wavelength of the display light 21.

The second interface 25 has a transmittance greater than 95% for the visual observation light and a reflectance between approximately 60% and approximately 80%, preferably approximately 70%, and a transmittance between approximately 20% and approximately 40%, preferably approximately 30%, for the wavelength region of the measurement beam 9a, 9b. A mirror element 27 in the vicinity of the transmitter 8a is provided on the first wedge-shaped subprism 10a". The mirror element 27 can be designed as a silver mirror.

In the beam splitter element 10" in FIG. 3, the acute angle $\alpha_3$ of the first wedge-shaped subprism 10a" is 22.5° and the acute angle $\beta_3$ of the second wedge-shaped subprism 10b" is 30°.

Figure 4:
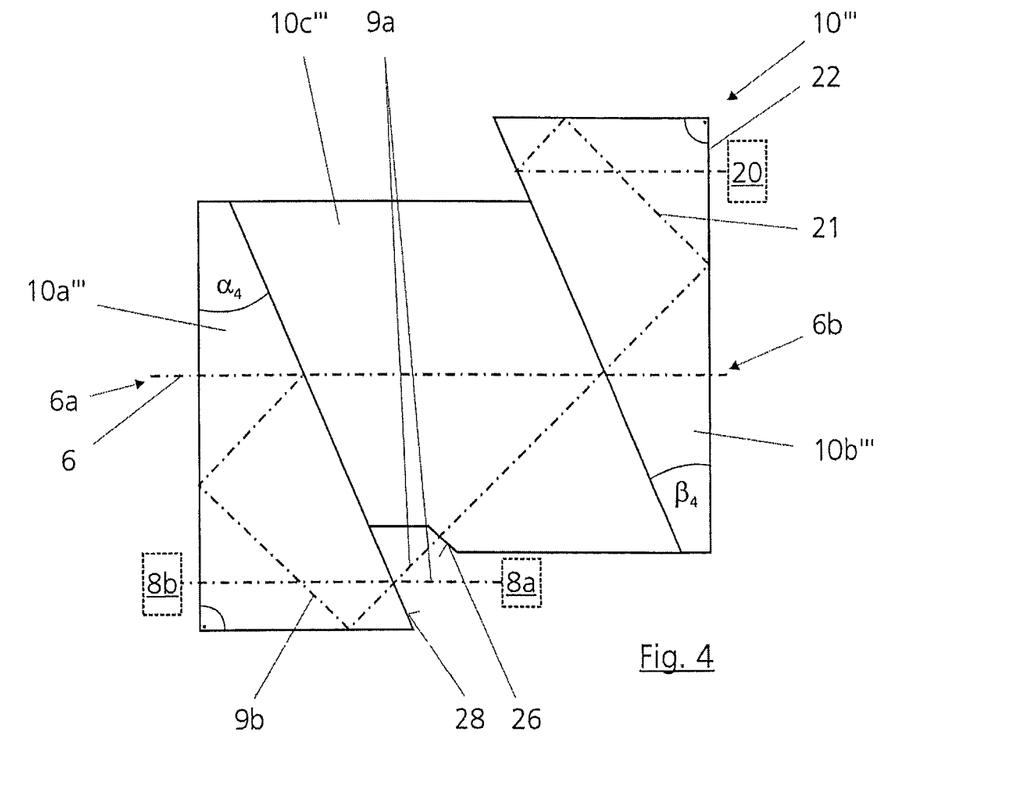
FIG. 4 shows a schematic side view of a beam splitter element in a fourth embodiment for the telescopic sight according to the invention.

FIG. 4 illustrates a fourth embodiment of a beam splitter element 10'''. The acute angle $\alpha_4$ of the first wedge-shaped subprism 10a''' is 22.5° and the acute angle $\beta_4$ of the second wedge-shaped subprism 10b''' is likewise 22.5°. This affords the possibility of, so to speak, designing the third subprism 10c''' as a parallelogram. The measurement beam 9a emanating from the transmitter 8a is first of all reflected at a third reflecting surface 28 of the first wedge-shaped subprism 10a''' before it impinges on the surface 26 of the third subprism 10c'''.

The first wedge-shaped subprism 10a, 10a', 10a", 10a''', 100a and the second wedge-shaped subprism 10b, 10b', 10b", 10b''', 100b of the beam splitter element 10, 10', 10", 10''' are arranged twisted with respect to one another such that the beam splitter element 10, 10', 10", 10''' is designed as a plane-parallel plate in at least one portion in the traversal direction of the observation beam path 6, even if the third subprism 10c", 10c''' is present.

Figure 5:
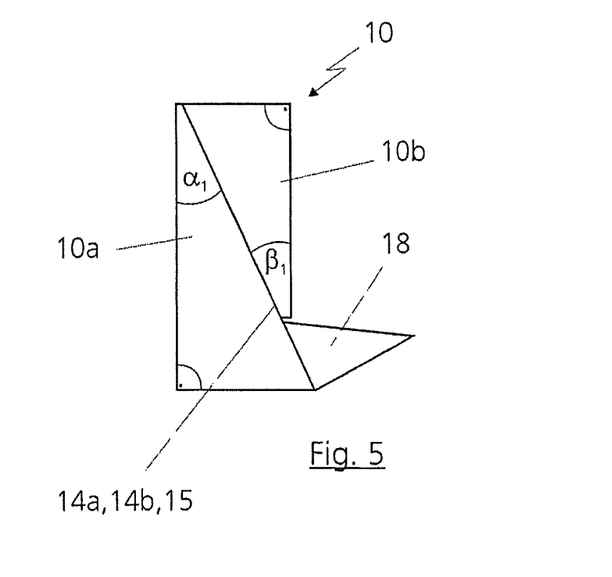
FIG. 5 shows a schematic side view of a beam splitter element in a first embodiment for the telescopic sight according to the invention.

FIG. 5 illustrates the first embodiment of the beam splitter element 10 in more detail, the latter being provided in the telescopic sight 1 according to the invention from FIG. 1. The prism 18 is likewise arranged on the beam splitter element 10.

FIGS. 6 to 9 illustrate perspective illustrations of the beam splitter element 10 or the subcomponents 10a, 10b, 18 thereof. The subcomponents 10a, 10b, 18 are combined to form the monolithic beam splitter element 10 by e.g. cementing or the like. In a simplified fashion, the optically effective regions are highlighted by shading in FIGS. 6 to 9.

Figure 6:
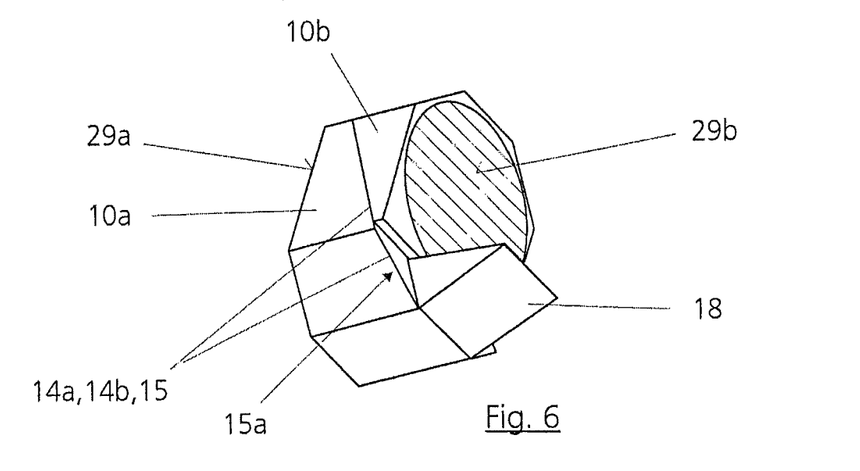
FIG. 6 shows a perspective illustration of the beam splitter element as per the first embodiment from FIG. 5.

FIG. 6 shows a perspective illustration of the entire monolithic beam splitter element 10.

Figure 7:
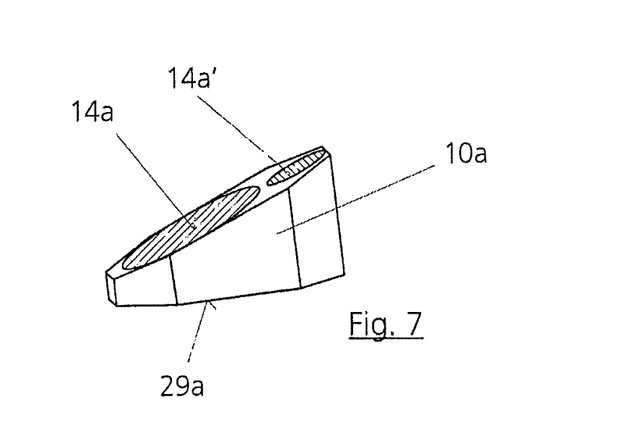
FIG. 7 shows a perspective illustration of a first objective-side wedge-shaped subprism of the beam splitter element as per the first embodiment.
Figure 8:
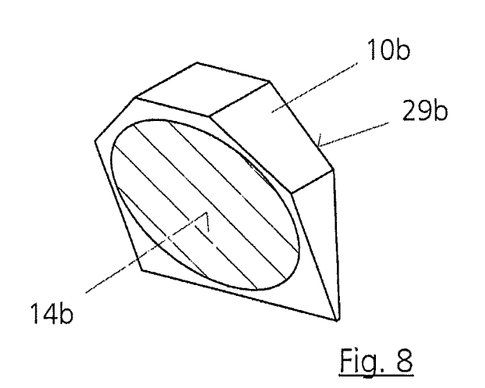
FIG. 8 shows a perspective illustration of the second eyepiece-side wedge-shaped subprism of the beam splitter element as per the first embodiment.

The first wedge-shaped subprism 10a and the second wedge-shaped subprism 10b are likewise illustrated in a perspective fashion in FIGS. 7 and 8.

The interface 14a and the face 29a of the first wedge-shaped subprism 10a opposite the interface 14a each have a transmittance greater than 99% for radiation in a wavelength range between 380 nm and 950 nm. The interface 14a can also have a region 14a' with a reflectance between approximately 60% and approximately 80%, preferably approximately 70%, and a transmittance between approximately 20% and approximately 40%, preferably approximately 30%, for the radiation in a wavelength range between 850 nm and 950 nm, as a result of which the first interface 15 has this optical property in the region 15a adjoining the prism 18. Alternatively, as indicated in FIG. 9, a corresponding contact face 30 of the prism 18 with the first wedge-shaped subprism 10a can have a reflectance between approximately 60% and approximately 80%, preferably approximately 70%, and a transmittance between approximately 20% and approximately 40%, preferably approximately 30%, for the radiation in a wavelength range between 850 nm and 950 nm.

The interface 14b of the second wedge-shaped subprism 10b has a transmittance greater than 95% for radiation in the wavelength range between 350 nm and 700 nm and a reflectance greater than 99% for radiation in a wavelength range from 850 nm to 950 nm. In further exemplary embodiments, the interface 14a could also have a reflectance greater than 99% for the radiation in a wavelength range between 850 nm and 950 nm. The face 29b of the second wedge-shaped subprism 10b opposite the interface 14b has a transmittance greater than 99% for radiation in a wavelength range between 350 nm and 700 nm.

Figure 9:
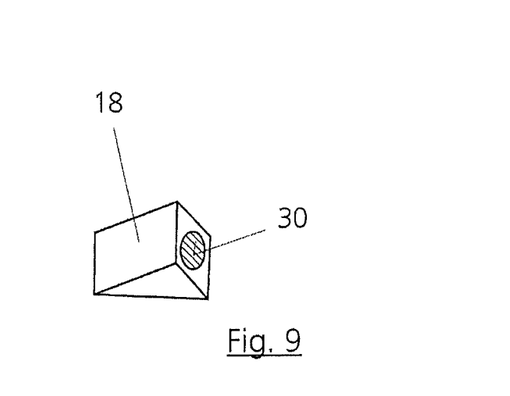
FIG. 9 shows a perspective illustration of an additional prism of the beam splitter element as per the first embodiment.

FIG. 9 shows the prism 18 in a perspective view.

Figure 10:
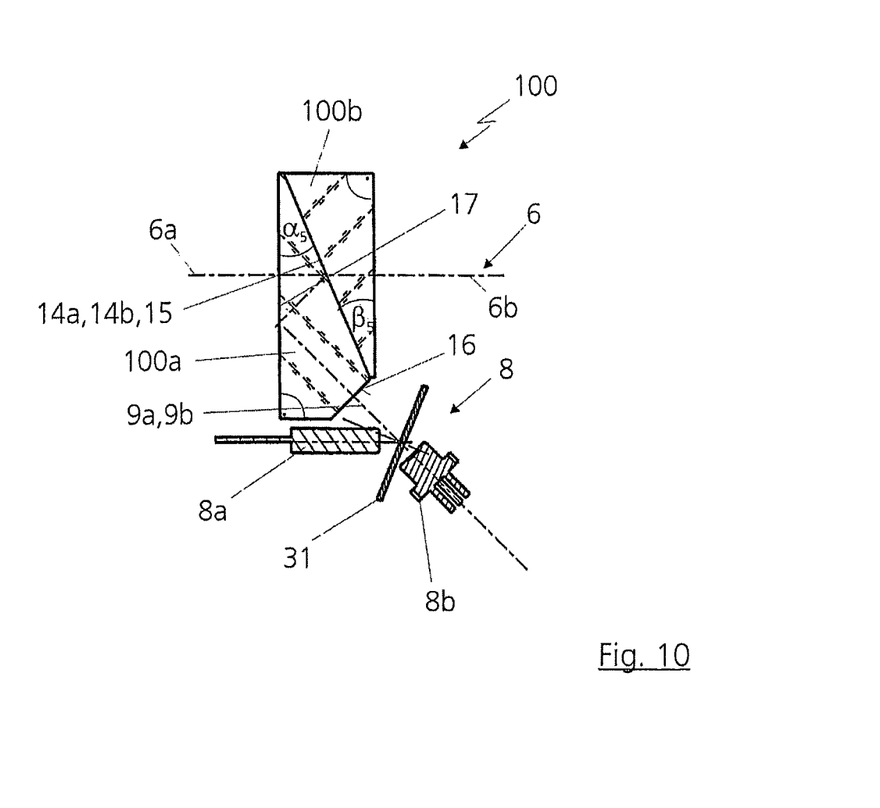
FIG. 10 shows a schematic side view of a beam splitter element in a fifth embodiment with a further splitter element for the telescopic sight according to the invention.

In FIG. 10, a further splitter element 31 is arranged for splitting emitted and received reflected measurement beams 9a, 9b in the beam direction between firstly a beam splitter element 100 and secondly the transmitter 8a of the rangefinder and the receiver 8b of the rangefinder 8. The beam splitter element 100 likewise has a monolithic design without image inversion and has a first objective-side wedge-shaped subprism 100a and a second eyepiece-side wedge-shaped subprism 100b, which respectively have interfaces 14a, 14b between which a first interface plane 15 is provided. The acute angles $\alpha_5$, $\beta_5$ are 25° in each case. FIG. 10 furthermore shows that the measurement beam 9a emanating from the transmitter 8a impinges, after deflecting at the further splitter element 31, on a first surface 16 of the first wedge-shaped subprism 100a, traverses the first wedge-shaped subprism 100a under a reflection on the inner face 17 thereof, and is deflected into the part 6a of the observation beam path extending toward the objective 3 at the first interface plane 15 and is guided to a target object 2 (not illustrated in FIG. 10). A received reflected measurement beam 9b incident on the first wedge-shaped subprism 100a along the observation beam path 6 is deflected out of the observation beam path 6 at the first interface plane 15, traverses the first wedge-shaped subprism 100a under a reflection on the inner face 17 thereof, emerges from the first surface 16 of the first wedge-shaped subprism 100a and is guided onto the receiver 8b through the further splitter element 31.

The further splitter element 31 is likewise fixed in an immovable fashion to the transmitter 8a of the rangefinder 8, the receiver 8b of the rangefinder 8, the beam splitter element 100 and to the inner tube 11 of the telescopic sight 1 such that the further splitter element 31 are also movable by the means 13 of the telescopic sight 1 for adjusting the direction of the sight line. The further splitter element 31 has a reflectance greater than or equal to 50%, preferably approximately 70%, and a transmittance less than or equal to 50%, preferably approximately 30%, for the wavelength range of the measurement beam 9a, 9b. The optical properties could also be selected in a complementary fashion to obtain the same effect. Thus, it would also be feasible for the further splitter element 31 to have a transmittance greater than or equal to 50%, preferably approximately 70%, and a reflectance less than or equal to 50%, preferably approximately 30%, for the wavelength range of the measurement beam 9a, 9b.

The display light 21 can lie in a wavelength range between 630 nm and 690 nm.

The measurement beam 9a, 9b can lie in a wavelength range between 850 nm and 950 nm, preferably at 905 nm.

Since the beam paths and beam directions can be reversed, the positions of the transmitters 8a and the receivers 8b of the rangefinder 8 can be interchanged in all arrangements illustrated in FIGS. 1 to 4 and 10. It is also possible, as mentioned above, for the optical properties or splitter ratios of the splitter elements to be designed to be complementary.

While the invention has been described with reference to certain preferred embodiments, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated by the inventor for carrying out the invention, but that the invention will include all embodiments falling within the scope of the appended claims.

I claim:

1. A telescopic sight for observation of a target object along a visual observation beam path which passes through said telescopic sight, said telescopic sight, comprising:
    an objective to face the target object;
    an eyepiece to face the observer of the target object;
    an inner tube with an inversion system;
    means for adjusting a direction of a sight line of the telescopic sight by moving said inner tube;
    a scope housing;
    a rangefinder integrated within said scope housing, said rangefinder having a transmitter for emitting a measurement beam and a receiver for receiving a reflected measurement beam, said reflected measurement beam being a reflection of said measurement beam from the target object;
    a beam splitter element arranged in the observation beam path, said beam splitter element coupling said measurement beam into a part of the observation beam path extending toward said objective and decoupling said reflected measurement beam from said part of the observation beam path extending toward said objective, said transmitter, said receiver and said beam splitter element being fixed in an immovable fashion with respect to each other and with respect to said inner tube such that said transmitter, said receiver and said beam splitter element are movable by said means for adjusting said direction of said sight line.

2. A telescopic sight as claimed in claim 1, wherein said beam splitter element has a first objective-side wedge-shaped subprism and a second eyepiece-side wedge-shaped subprism, said first objective-side wedge-shaped subprism having a first interface, said second eyepiece-side wedge-shaped subprism having a second interface, a first interface plane being provided between said first interface and said second interface.

3. A telescopic sight as claimed in claim 2, wherein said first objective-side wedge-shaped subprism and said second eyepiece side wedge-shaped subprism each have acute angles which lie in a range between 17.5 degrees and 35 degrees.

4. A telescopic sight as claimed in claim 2, wherein said first objective-side wedge-shaped subprism has a base having a right angle situated opposite said first interface and said second eyepiece-side wedge-shaped subprism has a base having a right angle situated opposite said second interface.

5. A telescopic sight as claimed in claim 2, wherein said first interface and said second interface abut one another in said first interface plane.

6. A telescopic sight as claimed in claim 2, wherein said first objective-side wedge-shaped subprism includes a plurality of inner faces and wherein said measurement beam impinges on a first surface of said first objective-side wedge-shaped subprism, traverses said first objective-side wedge-shaped subprism by way of one or more reflections from said inner faces of said first objective-side wedge-shaped subprism, said measurement beam being deflected into said part of the observation beam path extending toward said objective at said first interface plane and guided to the target object.

7. A telescopic sight as claimed in claim 6, wherein an additional optical element is arranged on said beam splitter element, said additional optical element guiding said measurement beam onto said first surface of said first objective-side wedge-shaped subprism.

8. A telescopic sight as claimed in claim 7, wherein said measurement beam has a first wavelength range and wherein said first interface plane has, in a region adjoining said additional optical element, a reflectance greater than or equal to 50% and a transmittance of less than or equal to 50% for said first wavelength range.

9. A telescopic sight as claimed in claim 2, wherein said first objective-side wedge-shaped subprism includes a plurality of inner faces and wherein a said reflected measurement beam incident on said first objective-side wedge-shaped subprism along the observation beam path is deflected out of the observation beam path at said first interface plane, traverses said first objective-side wedge-shaped subprism by way of a plurality of reflections from said inner faces of said first objective-side wedge-shaped subprism, emerges from a second surface of said first objective-side wedge-shaped subprism and is guided onto said receiver.

10. A telescopic sight as claimed in claim 1, further comprising a display device for displaying an image in said observation beam path.

11. A telescopic sight as claimed in claim 10, wherein said image displayed by said display device can be coupled into said part of the observation beam path extending toward said eyepiece by said beam splitter element.

12. A telescopic sight as claimed in claim 10, wherein said display device is fixed in an immovable fashion to said transmitter, said receiver, said beam splitter element and to said inner tube such that said display device is movable by said means for adjusting said direction of said sight line.

13. A telescopic sight as claimed in claim 10, wherein said beam splitter element has a first objective-side wedge-shaped subprism and a second eyepiece-side wedge-shaped subprism, said first objective-side wedge-shaped subprism having a first interface, said second eyepiece-side wedge-shaped subprism having a second interface, a first interface plane being located between said first interface and said second interface, said second eyepiece-side wedge-shaped subprism including a plurality of inner faces and wherein a display light emanating from said display device impinges on a surface of said second eyepiece-side wedge-shaped subprism, traverses said second eyepiece-side wedge-shaped subprism by way of a plurality of reflections from said inner faces of said second objective-side wedge-shaped subprism, and is deflected at said first interface plane into said part of the observation beam path extending toward said eyepiece.

14. A telescopic sight as claimed in claim 1, wherein said measurement beam has a first wavelength range and wherein said beam splitter element has a first objective-side wedge-shaped subprism and a second eyepiece-side wedge-shaped subprism, said first objective-side wedge-shaped subprism having a first interface, said second eyepiece-side wedge-shaped subprism having a second interface, said first interface and said second interface abutting one another along a first interface plane, at least one portion of said first interface plane having a transmittance of greater than or equal to 95% for visual observation light and a reflectance greater than or equal to 99% for said first wavelength range.

15. A telescopic sight as claimed in claim 13, wherein said display light has a second wavelength range and wherein at least one portion of said first interface plane has a reflectance greater than or equal to 30% for said second wavelength range of said display light and a transmittance of approximately 65% in said second wavelength range.

16. A telescopic sight as claimed in claim 2, wherein said first objective-side wedge-shaped subprism and the second eyepiece-side wedge-shaped subprism of said beam splitter element are twisted with respect to one another such that said beam splitter element is designed as a plane-parallel plate in at least one portion in a traversal direction of the observation beam path.

17. A telescopic sight as claimed in claim 1, wherein a further splitter element is arranged for splitting said measurement beam and said reflected measurement beam in a beam direction between firstly said beam splitter element and secondly said transmitter and said receiver.

18. A telescopic sight as claimed in claim 17, wherein said further splitter element is fixed in an immovable fashion to said transmitter, said receiver, said beam splitter element and to said inner tube such that said further splitter element is movable by said means for adjusting said direction of said sight line.

19. A telescopic sight as claimed in claim 17, wherein said measurement beam has a first wavelength range and wherein said further splitter element has a reflectance of greater than or equal to 50% and a transmittance of less than or equal to 50%, for said first wavelength range.

20. A telescopic sight as claimed in claim 2, wherein said beam splitter element has a monolithic design without image inversion.

21. A telescopic sight as claimed in claim 2, wherein said first objective-side wedge-shaped subprism and said second eyepiece-side wedge-shaped subprism each have acute angles which lie in a range between 22.5 degrees and 30 degrees.

22. A telescopic sight as claimed in claim 2, wherein said first objective-side wedge-shaped subprism and said second eyepiece side wedge-shaped subprism each have acute angles of approximately 25 degrees.

23. A telescopic sight as claimed in claim 7, wherein said measurement beam has a first wavelength range and wherein said first interface plane has, in a region adjoining said additional optical element, a reflectance of approximately 70% for said first wavelength range.

24. A telescopic sight as claimed in claim 7, wherein said measurement beam has a first wavelength range and wherein said first interface plane has, in a region adjoining said additional optical element, a transmittance of approximately 30%, for said first wavelength range.

25. A telescopic sight as claimed in claim 7, wherein said measurement beam has a first wavelength range and wherein said first interface plane has, in a region adjoining said additional optical element, a reflectance of approximately 70% for said first wavelength range and a transmittance of approximately 30%, for said first wavelength range.

26. A telescopic sight as claimed in claim 17, wherein said measurement beam has a first wavelength range and wherein said further splitter element has a reflectance of approximately 70%, for said first wavelength range.

27. A telescopic sight as claimed in claim 17, wherein said measurement beam has a first wavelength range and wherein said further splitter element has a transmittance of approximately 30% for said first wavelength range.

28. A telescopic sight as claimed in claim 17, wherein said measurement beam has a first wavelength range and wherein said further splitter element has a reflectance of approximately 70%, and a transmittance of approximately 30% for said first wavelength range.

29. A telescopic sight as claimed in claim 1, wherein said beam splitter element has a monolithic design without image inversion.

30. A telescopic sight as claimed in claim 7, wherein said additional optical element is a prism.

31. A telescopic sight as claimed in claim 6, wherein an additional optical element is arranged on said first objective-side wedge-shaped subprism, said additional optical element guiding said measurement beam onto said first surface of said first objective-side wedge-shaped subprism.

32. A telescopic sight as claimed in claim 31, wherein said additional optical element is a prism.

33. A telescopic sight for observation of a target object by an observer along a visual observation beam path which passes through said telescopic sight, said telescopic sight, comprising:
a scope housing;
an objective mounted within said scope housing to face the target object;
an eyepiece mounted within said the scope housing to face the observer;
an inner tube containing an inversion system, said inner tube being mounted movably within said scope housing for adjusting a direction of a sight line of the telescopic sight by moving said inner tube within said scope housing;
a rangefinder within said scope housing, said rangefinder including a transmitter for emitting a measurement beam and a receiver for receiving a reflected measurement beam, and
a beam splitter element in the observation beam path, said beam splitter element coupling said measurement beam into a part of the observation beam path extending toward said objective and decoupling said reflected measurement beam from said part of the observation beam path extending toward said objective; said transmitter, said receiver and said beam splitter element being fixed in an immovable fashion with respect to each other and with respect to said inner tube such that said transmitter, said receiver and said beam splitter element move with said inner tube as said direction of said sight line is adjusted.

34. A telescopic sight as claimed in claim 33, wherein said beam splitter element has a first objective-side wedge-shaped subprism and a second eyepiece-side wedge-shaped subprism, said first objective-side wedge-shaped subprism having a first interface, said second eyepiece-side wedge-shaped subprism having a second interface, a first interface plane being provided between said first interface and said second interface.

35. A telescopic sight as claimed in claim 34, wherein said first objective-side wedge-shaped subprism and said second eyepiece side wedge-shaped subprism each have acute angles which lie in a range between 17.5 degrees and 35 degrees.

36. A telescopic sight as claimed in claim 34, wherein said first objective-side wedge-shaped subprism has a base having a right angle situated opposite said first interface and said second eyepiece-side wedge-shaped subprism has a base having a right angle situated opposite said second interface.

37. A telescopic sight as claimed in claim 34, wherein said first interface and said second interface abut one another in said first interface plane.

38. A telescopic sight as claimed in claim 34, wherein said first objective-side wedge-shaped subprism includes a plurality of inner faces and wherein said measurement beam impinges on a first surface of said first objective-side wedge-shaped subprism, traverses said first objective-side wedge-shaped subprism by way of one or more reflections from said inner faces of said first objective-side wedge-shaped subprism, said measurement beam being deflected into said part of the observation beam path extending toward said objective at said first interface plane and guided to the target object.

39. A telescopic sight as claimed in claim 38, wherein an additional optical element is arranged on said beam splitter element said additional optical element guiding said measurement beam onto said first surface of said first objective-side wedge-shaped subprism.

40. A telescopic sight as claimed in claim 39, wherein said measurement beam has a first wavelength range and wherein said first interface plane has, in a region adjoining said additional optical element, a reflectance greater than or equal to 50% and a transmittance of less than or equal to 50% for said first wavelength range.

41. A telescopic sight as claimed in claim 34, wherein said first objective-side wedge-shaped subprism includes a plurality of inner faces and wherein a said reflected measurement beam incident on said first objective-side wedge-shaped subprism along the observation beam path is deflected out of the observation beam path at said first interface plane, traverses said first objective-side wedge-shaped subprism by way of a plurality of reflections from said inner faces of said first objective-side wedge-shaped subprism, emerges from a second surface of said first objective-side wedge-shaped subprism and is guided onto said receiver.

42. A telescopic sight as claimed in claim 33, further comprising a display device for displaying an image in said observation beam path.

43. A telescopic sight as claimed in claim 42, wherein said image displayed by said display device can be coupled into said part of the observation beam path extending toward said eyepiece by said beam splitter element.

44. A telescopic sight as claimed in claim 42, wherein said display device is fixed in an immovable fashion to said transmitter, said receiver, said beam splitter element and to said inner tube such that said display device is movable by said means for adjusting said direction of said sight line.

45. A telescopic sight as claimed in claim 42, wherein said beam splitter element has a first objective-side wedge-shaped subprism and a second eyepiece-side wedge-shaped subprism, said first objective-side wedge-shaped subprism having a first interface, said second eyepiece-side wedge-shaped subprism having a second interface, a first interface plane being located between said first interface and said second interface, said second eyepiece-side wedge-shaped subprism including a plurality of inner faces and wherein a display light emanating from said display device impinges on a surface of said second eyepiece-side wedge-shaped subprism, traverses said second eyepiece-side wedge-shaped subprism by way of a plurality of reflections from said inner faces of said second objective-side wedge-shaped subprism, and is deflected at said first interface plane into said part of the observation beam path extending toward said eyepiece.

46. A telescopic sight as claimed in claim 33, wherein said measurement beam has a first wavelength range and wherein said beam splitter element has a first objective-side wedge-shaped subprism and a second eyepiece-side wedge-shaped subprism, said first objective-side wedge-shaped subprism having a first interface, said second eyepiece-side wedge-shaped subprism having a second interface, said first interface and said second interface abutting one another along a first interface plane, at least one portion of said first interface plane having a transmittance of greater than or equal to 95% for visual observation light and a reflectance greater than or equal to 99% for said first wavelength range.

47. A telescopic sight as claimed in claim 45, wherein said display light has a second wavelength range and wherein at least one portion of said first interface plane has a reflectance greater than or equal to 30% for said second wavelength range of said display light and a transmittance of approximately 65% in said second wavelength range.

48. A telescopic sight as claimed in claim 34, wherein said first objective-side wedge-shaped subprism and the second eyepiece-side wedge-shaped subprism of said beam splitter element are twisted with respect to one another such that said beam splitter element is designed as a plane-parallel plate in at least one portion in a traversal direction of the observation beam path.

49. A telescopic sight as claimed in claim 33, wherein a further splitter element is arranged for splitting said measurement beam and said reflected measurement beam in a beam direction between firstly said beam splitter element and secondly said transmitter and said receiver.

50. A telescopic sight as claimed in claim 49, wherein said further splitter element is fixed in an immovable fashion to said transmitter, said receiver, said beam splitter element and to said inner tube such that said further splitter element is movable by said means for adjusting said direction of said sight line.

51. A telescopic sight as claimed in claim 49, wherein said measurement beam has a first wavelength range and wherein said further splitter element has a reflectance of greater than or equal to 50% and a transmittance of less than or equal to 50% for said first wavelength range.

* * * * *